Jan. 1, 1924.
R. E. KELM
1,479,246
COMBINATION TIRE HOLDER AND RECEPTACLE
Filed Aug. 6, 1921
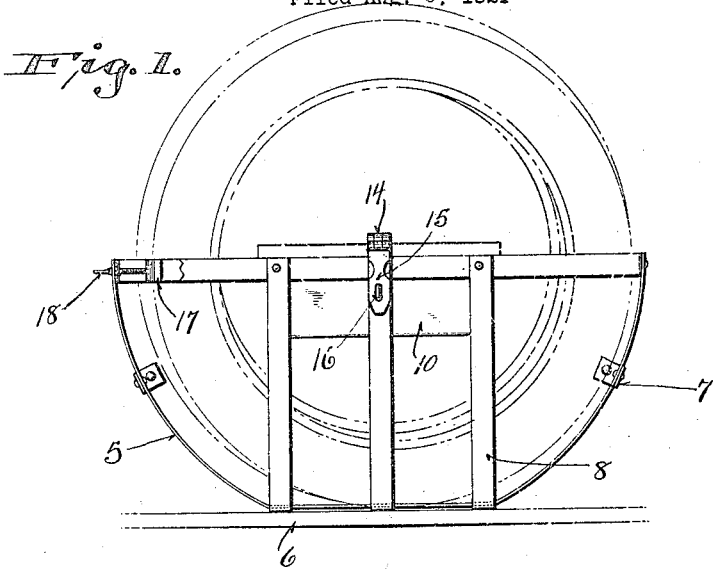
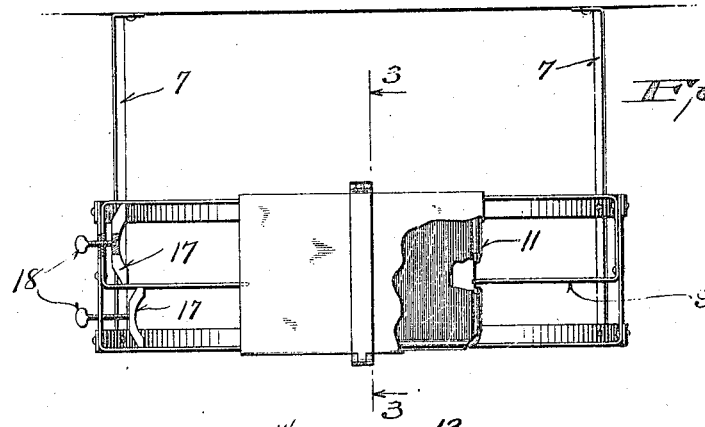
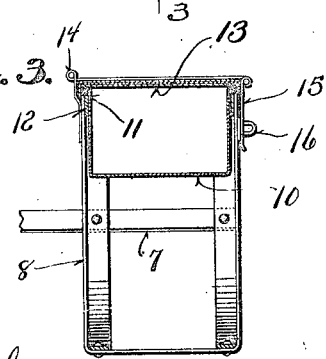
Witness:
Robert E. Weber
Inventor:
Richard E. Kelm
Young & Young
Attorneys Patented Jan. 1, 1924.

1,479,246

UNITED STATES PATENT OFFICE.

RICHARD E. KELM, OF MILWAUKEE, WISCONSIN.

COMBINATION TIRE HOLDER AND RECEPTACLE.

Application filed August 6, 1921. Serial No. 490,284.

*To all whom it may concern:*

Be it known that I, RICHARD E. KELM, a citizen of the United States, and resident of Milwaukee, in the county of Milwaukee and State of Wisconsin, have invented certain new and useful Improvements in Combination Tire Holders and Receptacles; and I do hereby declare that the following is a full, clear, and exact description thereof.

My invention relates to a new and improved combination tire holder and receptacle, which is adapted to be attached to a motor vehicle, or the like.

One important object of the invention is to provide a device of the character set forth in which one fastener and lock will suffice to lock the tool box and simultaneously secure the spare tire or tires against removal.

Another important object is to provide the tire holder with means, whereby to secure the tire against rattling, and at the same time, allow compensation for the wear on the thread of the tire.

With the above and other objects in view, the invention comprises certain details of construction and combination of parts which will be described in connection with the accompanying drawing and subsequently claimed.

In the drawing,

Figure 1 is a side elevation of my invention attached to the running board of a motor vehicle.

Figure 2 is a plan view of the same, with parts broken away to show better the construction thereof, and Figure 3 is a transverse sectional view on the line 3—3 of Figure 2.

Referring more specifically to the drawing, the invention comprises a cradle 5, which is substantially semi-circular in shape, and is adapted to be secured to the running board 6, and suitably braced by the braces 7.

The cradle is also provided with struts 8 to suitably brace the frame and I preferably construct the cradle so as to receive a plurality of tires which may be separated by the member 9. A tool box 10 is constructed of suitable size and shape to fit into the open side of the cradle, and this box is preferably provided around its rim with a bead 11 which seats on the straps 12, which constitute the upper rim of the cradle.

The box 10 is provided with a cover 13 which is suitably secured by a strap which is hinged at 14 and provided on its free end with a hasp 15 which engages over the eye 16. This eye may be rotated to fasten the hasp with the cover in its closed position, or a padlock may be provided for locking the same.

It will be noted that the box 10 extends across the open end of the cradle, so that when one or more tires are placed in the cradle and the box placed in position, the cover may be locked, thus securing the box and also the tires against unauthorized removal.

The cradle is constructed, as shown, with two or more compartments separated by the member 9 which is cut away at its central portion in order to provide a free space for the box 10. The compartments may be constructed, as shown, of different sizes to receive the different sized tires, which are often used on the front and rear wheels. Each of these compartments is provided at one side with a slidable block 17 and means are provided for adjusting these blocks to accommodate tires of different diameters, and to compensate for the treads when they become worn. This means, in the present instance, comprises a screw 18 which is threaded into the end of the cradle and has a swivel connection with the block 17.

By means of the construction above described it will be seen that the tires when they are placed in the cradle, may be secured against rattling by adjusting the blocks 17, as set forth, and when the tool box is placed in position and the cover locked, the tires will simultaneously be secured against unauthorized removal.

It is to be noted that the cradle is formed rigidly and its elements or parts are permanently secured and that the box is removably seated within the cradle. It is locked in position by the mechanism described and thus presents a barrier across the top of the cradle which prevents unauthorized removal of either the tire or the box. However, when the securing means is released, the box may be removed and carried to the place where the tools are to be used, thus lessening the work of the operator. It is also to be noted that this construction provides an extremely simple device which may be most cheaply manufactured and rapidly produced.

I claim as my invention:

1. A device of the character described comprising a cradle for receiving a tire, an adjustable block to compensate for variations in the diameter of the tire, a removable box having a cover and means for locking said cover in closed position and simultaneously locking the box in the cradle to prevent removal of the tire.

2. A device of the character described comprising a semi-circular cradle for receiving a tire, an adjustable block to compensate for variations in the diameter of the tire, means for attaching the cradle to a motor vehicle, a removable box, means for seating the box across the open side of the cradle, a cover for the box, a strap hinged to the side of the cradle, and means for locking said strap to secure the cover in closed position over the box and simultaneously locking the box in the cradle to prevent removal of the tire.

3. A device of the character described comprising a cradle having compartments for a plurality of tires of different sizes, an adjustable block in each compartment adapted to contact with the outer side of the corresponding tire, to compensate for variations in the diameter of the tire, a box having a cover, and means for locking said cover in closed position and simultaneously locking the box in the cradle to prevent removal of the tires.

In testimony that I claim the foregoing I have hereunto set my hand at Milwaukee, in the county of Milwaukee and State of Wisconsin.

RICHARD E. KELM.